(12) United States Patent
Anderson et al.

(10) Patent No.: US 10,093,230 B1
(45) Date of Patent: Oct. 9, 2018

(54) METHOD AND APPARATUS FOR NOTIFYING OF OBJECTS

(71) Applicant: GM GLOBAL TECHNOLOGY OPERATIONS LLC, Detroit, MI (US)

(72) Inventors: Stephen Anderson, Madison Heights, MI (US); William Asdell, Fraser, MI (US); Karen Haubert, Rochester Hills, MI (US); Thomas Kimbrell, Royal Oak, MI (US)

(*) Notice: Subject to any disclaimer, the term of this patent is extended or adjusted under 35 U.S.C. 154(b) by 0 days.

(21) Appl. No.: 15/652,918

(22) Filed: Jul. 18, 2017

(51) Int. Cl.
*G08B 1/08* (2006.01)
*B60Q 9/00* (2006.01)
*G08B 21/24* (2006.01)

(52) U.S. Cl.
CPC ............ *B60Q 9/00* (2013.01); *G08B 21/24* (2013.01)

(58) Field of Classification Search
CPC ........... G08B 21/22; G08B 21/24; B60Q 9/00

USPC .............. 340/539.32, 457, 568.1, 571; 362/488–492

See application file for complete search history.

(56) References Cited

U.S. PATENT DOCUMENTS

| | | | |
|---|---|---|---|
| 8,588,995 B2* | 11/2013 | Nagata | G07C 9/00309 340/539.32 |
| 9,552,717 B1* | 1/2017 | Rudolph | G08B 21/24 |
| 2005/0212676 A1* | 9/2005 | Steinberg | G06K 7/10079 340/539.32 |
| 2015/0061856 A1* | 3/2015 | Raman | G08B 21/24 340/457 |

* cited by examiner

*Primary Examiner* — Thomas Mullen

(57) ABSTRACT

A method and apparatus for notifying of objects are provided. The method includes detecting a presence of an occupant, detecting a position of an object associated with the occupant, and illuminating an area corresponding to the position of the object. The method may be used to notify occupants of a vehicle of an object placed in the vehicle by the occupant.

17 Claims, 4 Drawing Sheets

METHOD AND APPARATUS FOR NOTIFYING OF OBJECTS

INTRODUCTION

Apparatuses and methods consistent with exemplary embodiments relate to object detection and notification. More particularly, apparatuses and methods consistent with exemplary embodiments relate to detecting objects and providing reminders of detected objects to an occupant.

SUMMARY

One or more exemplary embodiments provide a method and an apparatus that notify of an object associated with an occupant. More particularly, one or more exemplary embodiments provide a method and an apparatus that notify of an object associated with an occupant by illuminating an area corresponding to the object associated with occupant, thereby reminding the occupant of the presence of the object.

According to an exemplary embodiment, a method of notifying of an object associated with an occupant is provided. The method includes detecting a presence of an occupant in a space, detecting a position of an object associated with the occupant, and illuminating an area corresponding to the position of the object.

The method may further include determining whether the occupant will be exiting the space, and the illuminating the area corresponding to the position of the object may be performed in response to determining that the occupant will be exiting the space.

The method may further include determining whether the occupant is nearing, arriving, or has arrived at a destination, and the illuminating the area corresponding to the position of the object may be performed in response to determining that the occupant is nearing, arriving, or has arrived at the destination.

The position of the object may be at least one of a cup holder, a seat, a floor, a charging pad, a glovebox, a center console, a storage container, a storage area, and a door compartment.

The illuminating the area may include activating a spotlight and controlling the spotlight to direct light at the position of the object.

The illuminating the area may include activating a light disposed at the area corresponding to the position of the object.

The activating the light disposed at the area corresponding to the position of the object may include activating one or more lights disposed in at least one from among a cup holder, a seat, a floor, a charging pad, a glovebox, a center console, a storage container, a storage area, and a door compartment.

The detecting the position of an object associated with the occupant may be performed based on information from at least one from among a heat detection sensor, an image sensor, a communication port, a weight sensor, and a pressure sensor.

The detecting the presence of the occupant in the space may be performed based information from at least one of a door open and close sensor, a heat detection sensor, an image sensor, a weight sensor, and a pressure sensor.

According to an exemplary embodiment, an apparatus that notifies of an object associated with an occupant is provided. The apparatus includes at least one memory comprising computer executable instructions; and at least one processor configured to read and execute the computer executable instructions. The computer executable instructions may cause the at least one processor to detect a presence of an occupant in a space, detect a position of an object associated with the occupant, and control to illuminate an area corresponding to the position of the object.

The computer executable instructions may cause the at least one processor to determine whether the occupant will be exiting the space, and cause the at least one processor to control to illuminate the area corresponding to the position of the object in response to determining that the occupant will be exiting the space.

The computer executable instructions may cause the at least one processor to determine whether the occupant is nearing, arriving, or has arrived at a destination, and cause the at least one processor to control to illuminate the area corresponding to the position of the object in response to determining that the occupant is nearing, arriving, or has arrived at the destination.

The position of the object may include at least one of a cup holder, a seat, a floor, a charging pad, a glovebox, a center console, a storage container, a storage area, and a door compartment.

The apparatus may further include a spotlight configured to direct light at the area corresponding to the position of the object, and the computer executable instructions may further cause the at least one processor to control to activate the spotlight and control the spotlight to direct light at the area corresponding to position of the object.

The spotlight may include at least one from among a swivel and a pivot, and the computer executable instructions may further cause the at least one processor to control to activate the spotlight to swivel or pivot to direct light to the area corresponding to the position of the object.

The spotlight may include a movable reflector, and the computer executable instructions may further cause the at least one processor to control to activate the spotlight to reposition the movable reflector to direct light to the area corresponding to position of the object.

The apparatus may further include one or more lights disposed in at least one from among a cup holder, a seat, a floor, a charging pad, a glovebox, a center console, a storage container, a storage area, and a door compartment, and the computer executable instructions may further cause the at least one processor to control to activate the one or more lights at the area corresponding to the position of the object.

The apparatus may further include at least one from among a heat detection sensor, an image sensor, a weight sensor, a communication port, and a pressure sensor, and the computer executable instructions may further cause the at least one processor to detect the position of object associated with the occupant based on information provided by the at least one from among a heat detection sensor, an image sensor, a weight sensor, and a pressure sensor.

The apparatus may further include at least one of a door open and close sensor, a heat detection sensor, an image sensor, a weight sensor, and a pressure sensor, and the computer executable instructions further cause the at least one processor to detect the presence of the occupant in the space based on information provided by the at least one from among a door open and close sensor.

Other objects, advantages and novel features of the exemplary embodiments will become more apparent from the following detailed description of exemplary embodiments and the accompanying drawings.

DETAILED DESCRIPTION OF EXEMPLARY EMBODIMENTS

Figure 1:
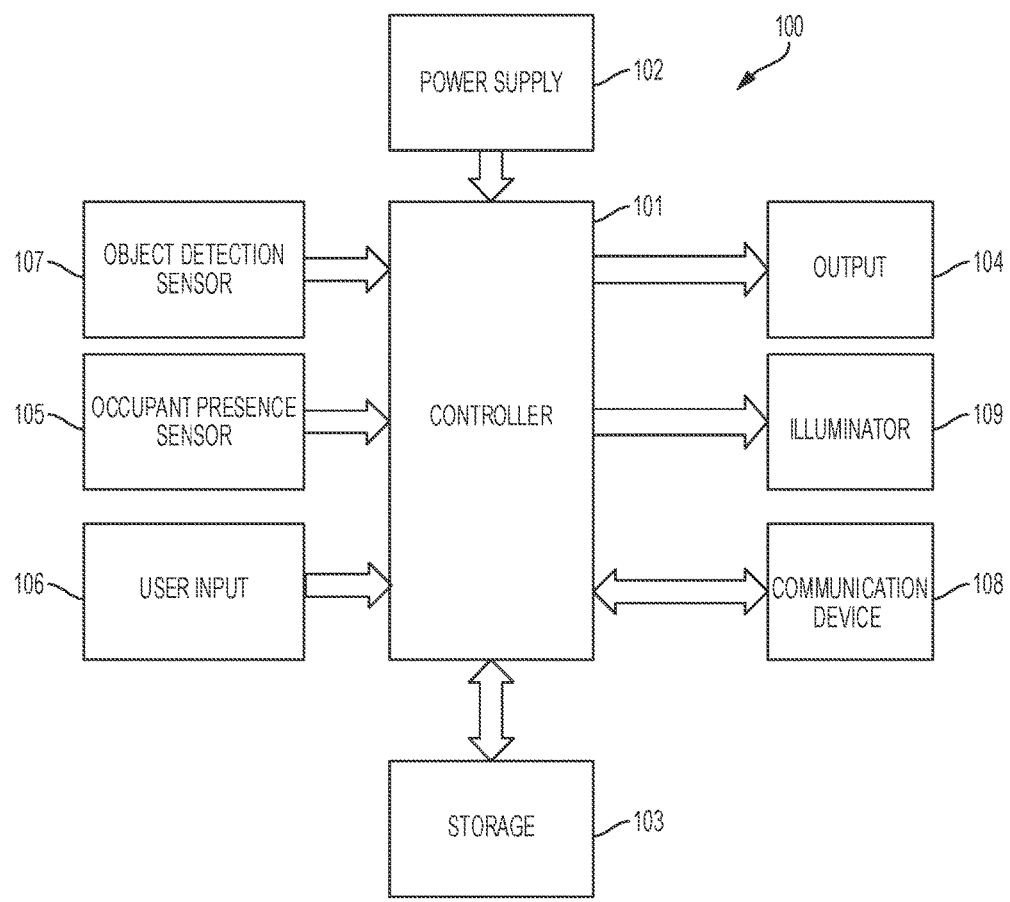
FIG. 1 shows a block diagram of an apparatus that notifies of an object associated with an occupant according to an exemplary embodiment.

An apparatus and method that notify of an object associated with an occupant will now be described in detail with reference to FIGS. 1-3B of the accompanying drawings in which like reference numerals refer to like elements throughout the disclosure.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "attached to," "formed on," or "disposed on" a second element, the first element may be connected directly to, formed directly on or disposed directly on the second element or there may be intervening elements between the first element and the second element, unless it is stated that a first element is "directly" connected to, attached to, formed on, or disposed on the second element. In addition, if a first element is configured to "send" or "receive" information from a second element, the first element may send or receive the information directly to or from the second element, send or receive the information via a bus, send or receive the information via a network, or send or receive the information via intermediate elements, unless the first element is indicated to send or receive information "directly" to or from the second element.

Throughout the disclosure, one or more of the elements disclosed may be combined into a single device or into one or more devices. In addition, individual elements may be provided on separate devices.

Vehicles and spaces are being equipped with sensors that are capable of detecting conditions of an environment in and around a vehicle. The sensors provide information on conditions that exist in the environment and this information may be used to control the vehicle or to assist an operator of a vehicle. Moreover, occupants or operators of vehicles or occupants of spaces may sometimes bring objects or possessions into the space or vehicle. This may cause a problem in that the object or possession may be forgotten or left behind in the space or vehicle upon the departure of occupant or operator. In this case, the occupant or operator may need to return to the space or vehicle to retrieve the object. Additionally, retrieval of the object from a vehicle or space that does not belong to the occupant or operator (e.g., a taxi, a shared ride, a friend's house) may be especially problematic or inconvenient.

One way to address the aforementioned issues is to detect the presence of the occupant and the presence of an object associated with the occupant, and to illuminate the object so as to provide a visual reminder of the presence of the object. One or more of the sensors may be used to detect objects, persons, and/or changes in a vehicle. For example, an image taken by a camera may be used by an operator to identify objects, persons, and/or changes to a vehicle. In addition, the placement of lights in areas where objects may be placed or stored or the addition of a device capable of directing light to the aforementioned areas may be used to provide the visual reminder to an occupant.

FIG. 1 shows a block diagram of an apparatus that notifies of an object associated with an occupant 100 according to an exemplary embodiment. As shown in FIG. 1, the apparatus that notifies of an object associated with an occupant 100, according to an exemplary embodiment, includes a controller 101, a power supply 102, a storage 103, an output 104, an occupant presence sensor 105, a user input 106, an object detection sensor 107, a communication device 108, and an illuminator 109. However, the apparatus that notifies of an object associated with an occupant 100 is not limited to the aforementioned configuration and may be configured to include additional elements and/or omit one or more of the aforementioned elements. The apparatus that notifies of an object associated with an occupant 100 may be implemented as part of a vehicle, as a standalone component, as a hybrid between an on-vehicle and off-vehicle device, or in another computing device.

The controller 101 controls the overall operation and function of the apparatus that notifies of an object associated with an occupant 100. The controller 101 may control one or more of a storage 103, an output 104, an occupant presence sensor 105, a user input 106, an object detection sensor 107, a communication device 108, and an illuminator 109 of the apparatus that notifies of an object associated with an occupant 100. The controller 101 may include one or more from among a processor, a microprocessor, a central processing unit (CPU), a graphics processor, Application Specific Integrated Circuits (ASICs), Field-Programmable Gate Arrays (FPGAs), state machines, circuitry, and a combination of hardware, software and firmware components.

The controller 101 is configured to send and/or receive information from one or more of the storage 103, the output 104, the occupant presence sensor 105, the user input 106, the object detection sensor 107, the communication device 108, and the illuminator 109 of the apparatus that notifies of an object associated with an occupant 100. The information may be sent and received via a bus or network, or may be directly read or written to/from one or more of the storage 103, the output 104, the occupant presence sensor 105, the user input 106, the object detection sensor 107, the communication device 108, the illuminator 109 of the apparatus that notifies of an object associated with an occupant 100. Examples of suitable network connections include a controller area network (CAN), a media oriented system transfer (MOST), a local interconnection network (LIN), a local area network (LAN), wireless networks such as Bluetooth and 802.11, and other appropriate connections such as Ethernet.

The power supply 102 provides power to one or more of the controller 101, the storage 103, the output 104, the occupant presence sensor 105, the user input 106, the object detection sensor 107, the communication device 108, and the illuminator 109 of the apparatus that notifies of an object associated with an occupant 100. The power supply 102 may include one or more from among a battery, an outlet, a capacitor, a solar energy cell, a generator, a wind energy device, an alternator, etc.

The storage 103 is configured for storing information and retrieving information used by the apparatus that notifies of an object associated with an occupant 100. The storage 103 may be controlled by the controller 101 to store and retrieve information received from the controller 101, the occupant presence sensor 105, the object detection sensor 107, and/or the communication device 108. The information may include information on occupants and/or objects detected by the occupant presence sensor 105 and the object detection sensor 107. The information may include one or more from among identification information of the occupant or object, an image of the occupant or object, position information of the occupant or object, movement information of the occupant or object, and destination information of the occupant. The storage 103 may also include the computer instructions configured to be executed by a processor to perform the functions of the apparatus that notifies of an object associated with an occupant 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus that notifies of an object associated with an occupant 100. The output 104 may include one or more from among a speaker, an audio device, a display, a centrally-located display, a head up display, a windshield display, a haptic feedback device, a vibration device, a tactile feedback device, a tap-feedback device, a holographic display, an instrument light, an indicator light, etc.

The output 104 may output notification including one or more from among an audible notification, haptic notification, a light notification, and a display notification. The notifications may indicate that an object was left in a vehicle, a position of the object, an image of the object, and/or identification or classification information on a detected object and/or feature.

The occupant presence sensor 105 is configured to provide information on one or more occupants of a space. The occupant presence sensor 105 may include one or more from among a heat detection sensor, an image sensor, a weight sensor, a laser sensor, an ultrasonic sensor, an infrared camera, a LIDAR, a radar sensor, an ultra-short range radar sensor, an ultra-wideband radar sensor, a microwave sensor and a pressure sensor.

The user input 106 is configured to provide information and commands to the apparatus that notifies of an object associated with an occupant 100. The user input 106 may be used to provide user inputs, etc., to the controller 101. The user input 106 may include one or more from among a touchscreen, a keyboard, a soft keypad, a button, a motion detector, a voice input detector, a microphone, a camera, a trackpad, a mouse, a steering wheel, a touchpad, etc. The user input 106 may be configured to receive a user input to acknowledge or dismiss the notification output by the output 104.

The object detection sensor 107 may include one or more from among a plurality of sensors including a camera, a communication port, an image sensor, a weight sensor, a pressure sensor, a laser sensor, an ultrasonic sensor, an infrared camera, a LIDAR, a radar sensor, an ultra-short range radar sensor, an ultra-wideband radar sensor, and a microwave sensor. The object detection sensor 107 may also be embodied as a wireless communication device configured to communicate with the object in order to detect the position or presence of the object.

The communication device 108 may be used by the apparatus that notifies of an object associated with an occupant 100 to communicate with various types of external apparatuses according to various communication methods. The communication device 108 may be used to send/receive information or images taken by the occupant presence sensor 105 and the object detection sensor 107. The communication device 108 may also be used to send information to control the illuminator 109. According to one example, the communication device 108 may be used to receive information used to determine a destination of an occupant, a distance to the destination of the occupant, an estimated time of arrival to the destination of the occupant.

The communication device 108 may include various communication modules such as one or more from among a telematics unit, a broadcast receiving module, a near field communication (NFC) module, a global navigation information receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The global navigation information receiver is a module that receives a GPS signal from a GPS satellite or other satellite or wireless signal based global positioning system and detects a current location. The wired communication module may be a module that receives information over a wired network such as a local area network, a controller area network (CAN), or an external network. The wireless communication module is a module that is connected to an external network by using a wireless communication protocol such as IEEE 802.11 protocols, WiMAX, Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long-term evolution (LTE), Bluetooth, EVDO, CDMA, GPRS, EDGE or ZigBee.

According to an exemplary embodiment, the controller 101 of the apparatus that notifies of an object associated with an occupant 100 may be configured to detect a presence of an occupant in a space, detect a position of an object associated with the occupant and control to illuminate an area corresponding to the position of the object.

The controller 101 may be configured to determine whether the occupant will be exiting the space based on information from the occupant presence sensor 105, and control to illuminate the area corresponding to the position of the object in response to determining that the occupant will be exiting the space.

The controller 101 may be configured to determine whether the occupant is arriving at a destination based on information received via the communication device 108 from an occupant's device or based on global navigation information, and to illuminate the area corresponding to the position of the object in response to determining that the occupant is arriving at the destination. The position of the object may be one or more of a cup holder, a charging pad, a glovebox, a center console, a storage container, a storage area, and a door compartment.

In one example, the controller 101 may be configured to control to activate the illuminator 109 embodied as a spotlight and control the spotlight to direct light at the area corresponding to position of the object. The controller 101 may control to activate the spotlight to swivel or pivot to direct light to the area corresponding to the position of the object or may control to activate the spotlight to reposition a movable reflector to direct light to the area corresponding to position of the object.

In another example, the controller 101 may be configured to control to activate the illuminator 109 embodied as one or more lights disposed in at least one from among a cup holder, a charging pad, a glovebox, a center console, a storage container, a storage area, and a door compartment. The controller 101 may be configured to control to activate the one or more lights at the area corresponding to the position of the object.

The controller 101 may be configured to detect the position of an object associated with the occupant based on information provided by the at least one from among a heat detection sensor, an image sensor, a weight sensor, and a pressure sensor. Moreover, the controller 101 may be configured to detect the presence of the occupant in the space based on information provided by the at least one from among a door open and close sensor, a heat detection sensor, an image sensor, a weight sensor, and a pressure sensor.

Figure 2:
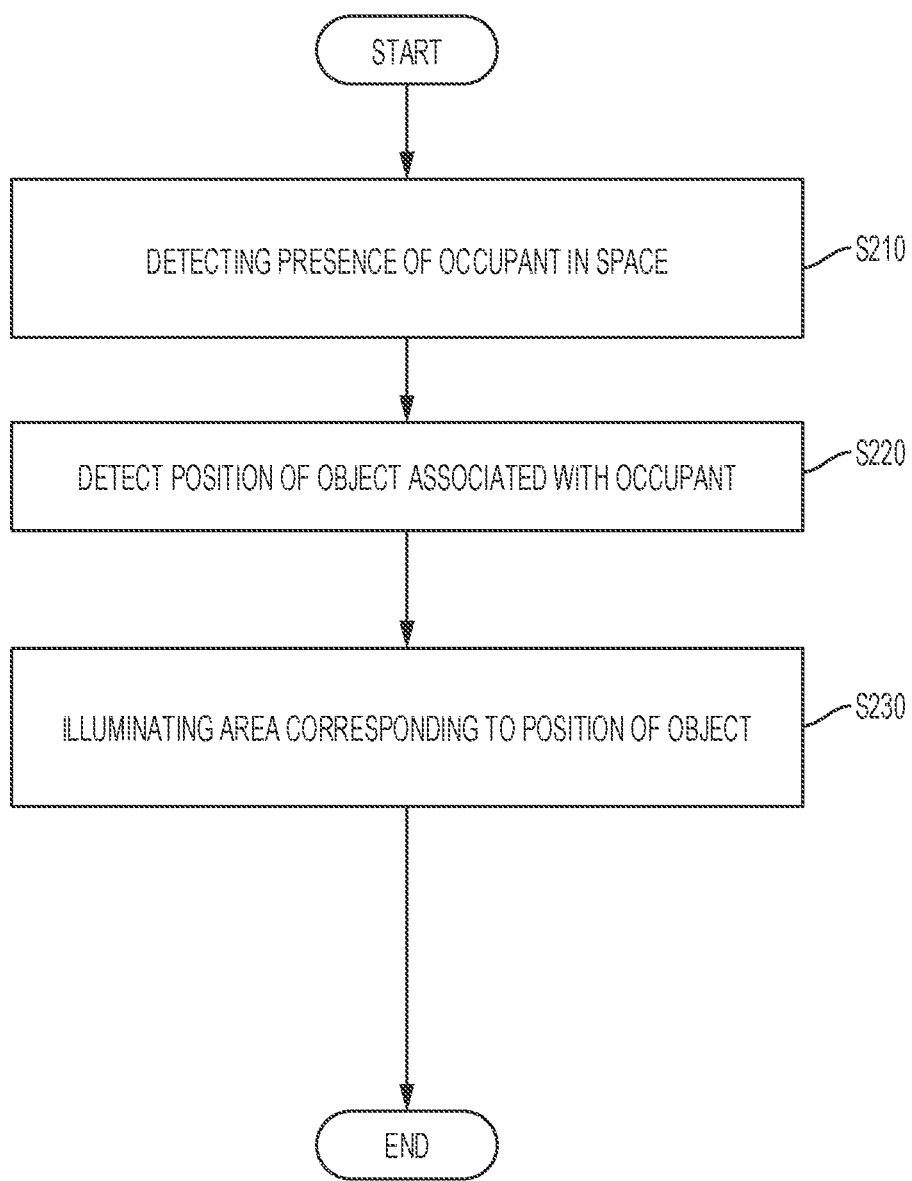
FIG. 2 shows a flowchart for a method of notifying of an object associated with an occupant according to an exemplary embodiment.

FIG. 2 shows a flowchart for a method of notifying of an object associated with an occupant according to an exemplary embodiment. The method of FIG. 2 may be performed by the apparatus that notifies of an object associated with an occupant 100 or may be encoded into a computer readable medium as instructions that are executable by a computer to perform the method.

Referring to FIG. 2, the presence of an occupant in a space is detected in operation S210. The space may be a vehicle cabin, a vehicle seat, a room, or other space that may be occupied by an occupant. The presence of the occupant may be detected using one or more occupant presence sensors 105. In one example, information on the opening and closing of a door and information on body heat or facial recognition may be used to detect the presence of the occupant.

In operation S220, the presence and/or position of an object associated with occupant may be detected. The object associated with the occupant may be a personal belonging such as a purse, book, mobile phone, or other item. The presence of the object may be detected with one or more object detection sensors 107. In one example, images may be taken by the object detection sensor 107 and object recognition performed on the images to determine the presence of an object in the space. In another example, information on the presence of an occupant may be combined with information on the presence of an object to determine an object is associated with an occupant. In yet another example, information from the object via a wireless communication signal such as Bluetooth or Wi-Fi may be used to determine the presence of an object or occupant.

In operation 230, an area corresponding to the position of the object may be illuminated. The area may be illuminated with illuminator 109. In one example, the area may be illuminated upon detecting the presence of the object. In another example, the area may be illuminated upon detecting the presence of the object and an occupant associated with the object (e.g., an owner of the object, or an occupant that brings the object into the space). In yet another example, the area may be illuminated upon arrival at the destination of the occupant, as the occupant opens a door to leave the space, as the occupant moves to leave the space, a predetermined time before arrival at the occupant's destination, or based on movement information of the occupant indicating that the occupant will be exiting the space or vehicle.

Figure 3A:
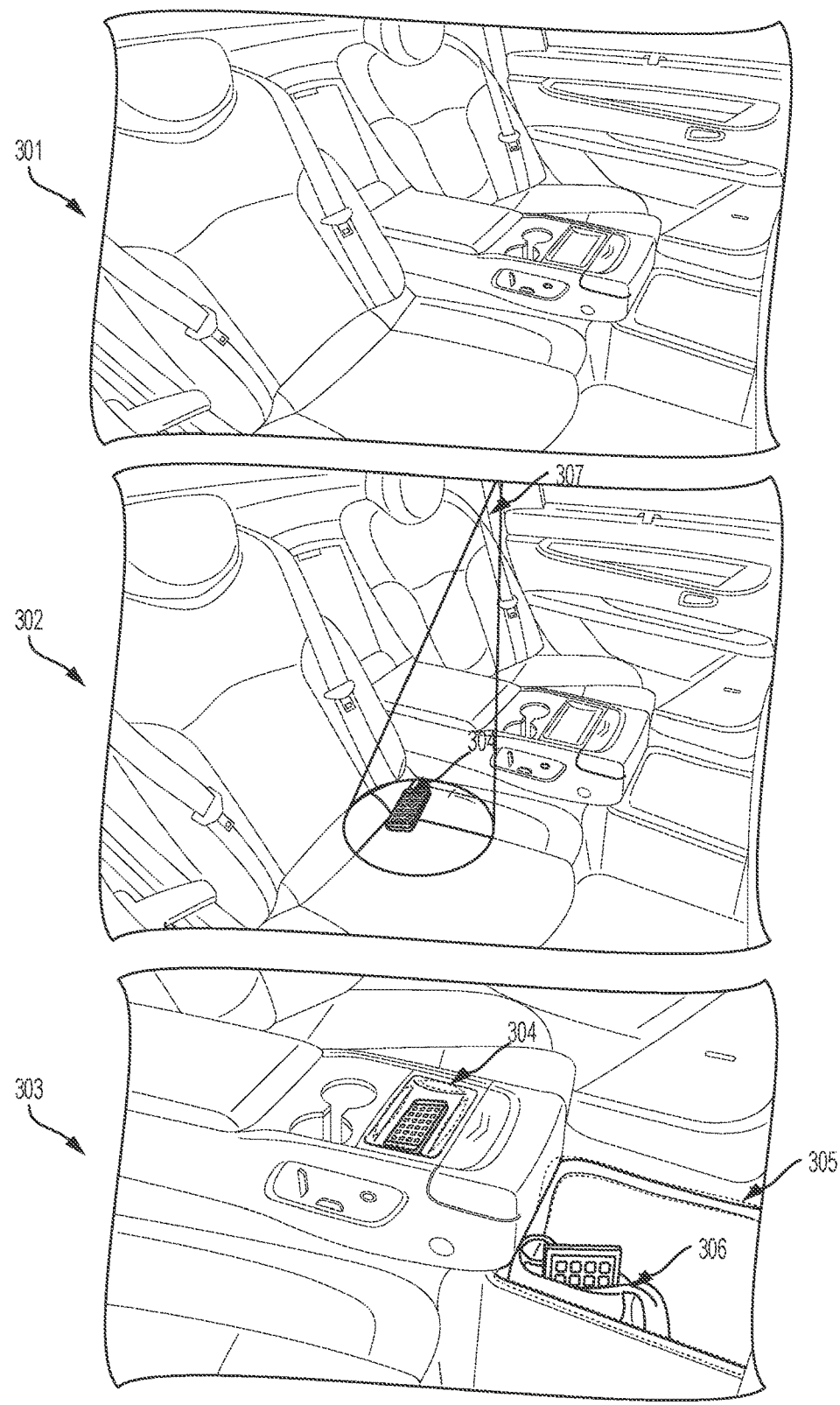
FIGS. 3A and 3B show illustrations of different methods of illuminating or notifying of an object associated with an occupant.
Figure 3B:
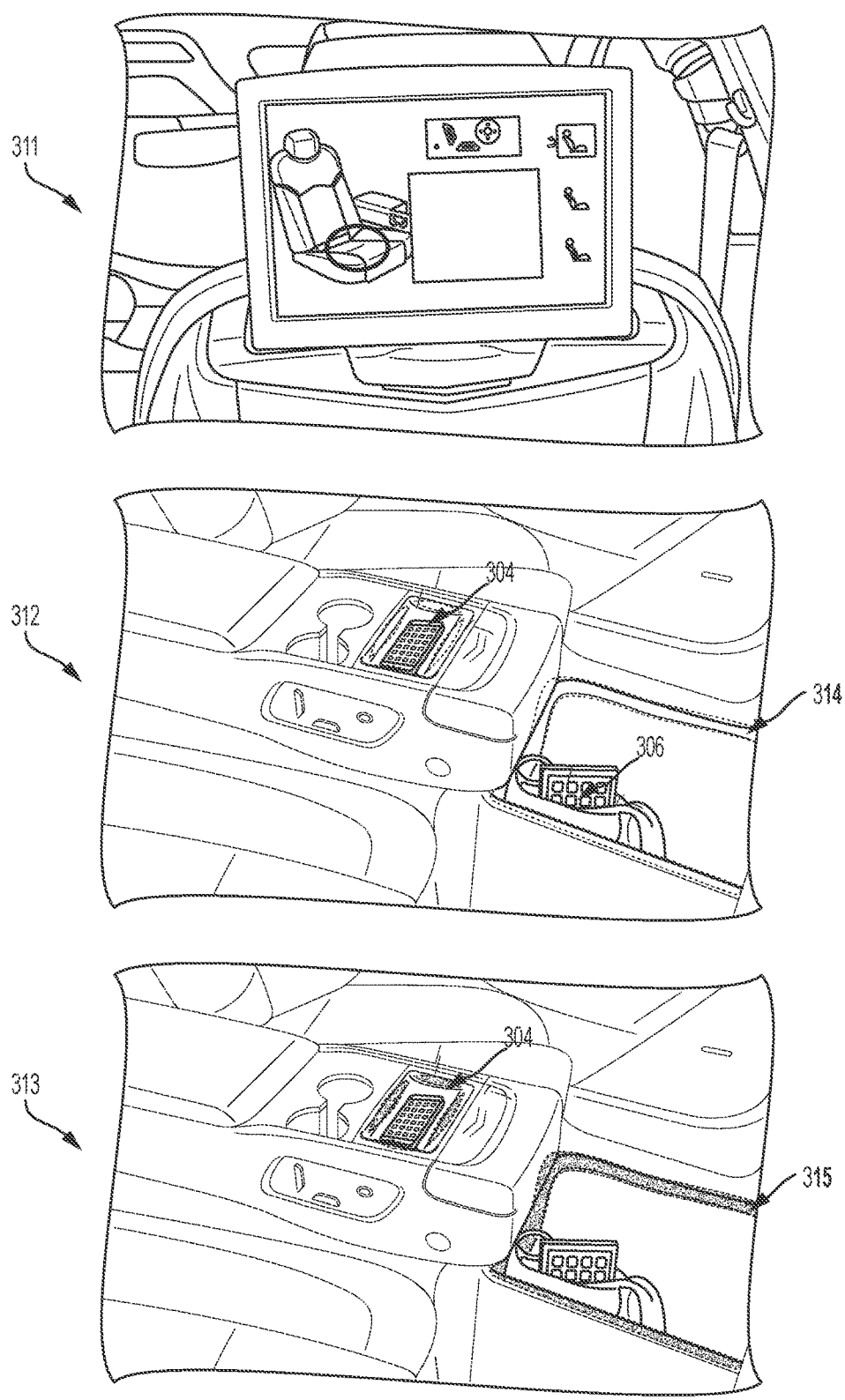

FIGS. 3A and 3B show illustrations of different methods of illuminating or notifying of an object associated with an occupant. The illustrations show examples of how the apparatus that notifies of an object associated with an occupant may operate.

Referring to FIG. 3A, illustration 301 shows a state of a space prior to an object(s) 304, 306 being detected. Illustration 302 shows an example of the operation of illuminator 109 embodied as a spotlight 307. In illustration 302, a mobile phone 304 is detected and illuminated by illuminator 109. The illumination of the object(s) 304, 306 by illuminator 109 may be triggered upon detection of the object(s) 304, 306, upon arrival at a destination, upon detecting the occupant intends to exit the space, or a predetermined time before arrival.

Illustration 303 shows an example of the operation of illuminator 109 embodied as a one or more lights or light strips 305 disposed in areas corresponding to the position of the object(s) 304, 306. In illustration 303, a mobile phone 304, is detected and illuminated by illuminator 109. The illuminator 109 is embodied as a strip of lights 305 around the compartment where the object(s) 304, 306 is located. The illumination of the object(s) 304, 306 by the one or more lights or light strips may be triggered upon detection of the object(s) 304, 306, upon arrival at a destination, upon detecting the occupant intends to exit the space, or a predetermined time before arrival.

Referring to FIG. 3B, examples of results of controlling the illuminator 109 and the output 104 to output combined notifications or other types of notifications of the object(s) 304, 306 associated with the occupant are shown. Illustration 311 shows a displayed notification to notify of the presence and location of the object(s) 304, 306 according to one aspect of an exemplary embodiment. The displayed output may be combined with output from the illuminator 109 and an audible or haptic output and may be triggered upon detection of the object, upon arrival at a destination, upon detecting the occupant intends to exit the space, or a predetermined time before arrival.

Illustrations 312-313 show an example of a transition of a color, intensity, etc. of the light of the illuminator 109. This transition illustrated by lights 314 and 315 may be triggered as the occupant nears a destination, arrives at a destination, is a predetermined distance from a destination, is a predetermined time from the destination, as the occupant exits the space, etc. The transition may attract the occupant's attention and alert the occupant of the presence of the object.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method of notifying of an object associated with an occupant, the method comprising:
   detecting a presence of an occupant in a space of a vehicle;
   detecting a position of an object associated with the occupant;
   determining whether the vehicle is nearing, arriving, or has arrived at a destination based on destination information received from an occupant or a device of an occupant and global navigation information corresponding to a location of the vehicle; and
   illuminating an area corresponding to the position of the object in response to determining that the vehicle is nearing, arriving, or has arrived at the destination.

2. The method of claim 1, further comprising:
   determining whether the occupant will be exiting the space,
   wherein the illuminating the area corresponding to the position of the object is performed in response to determining that the occupant will be exiting the space and determining that the vehicle has arrived at the destination.

3. The method of claim 1, wherein the position of the object within the space comprises at least one of a cup holder, a seat, a floor, a charging pad, a glovebox, a center console, a storage container, a storage area, and a door compartment.

4. The method of claim 1, wherein the illuminating the area comprises activating a spotlight and controlling the spotlight to direct light at the position of the object.

5. The method of claim 1, wherein the illuminating the area comprises activating a light disposed at the area corresponding to the position of the object.

6. The method of claim 5, wherein the activating the light disposed at the area corresponding to the position of the object comprises activating one or more lights disposed in at least one from among a cup holder, a seat, a floor, a charging pad, a glovebox, a center console, a storage container, a storage area, and a door compartment.

7. The method of claim 1, wherein the detecting the position of the object associated with the occupant is performed based on information from at least one from among a heat detection sensor, an image sensor, a communication port, a weight sensor, and a pressure sensor.

8. The method of claim 1, wherein the detecting the presence of the occupant in the space is performed based on information from at least of a door open and close sensor, a heat detection sensor, an image sensor, a weight sensor, and a pressure sensor.

9. A non-transitory computer readable medium comprising computer instructions executable by a computer to perform the method of claim 1.

10. An apparatus that notifies of an object associated with an occupant, the apparatus comprising:
    at least one memory comprising computer executable instructions; and
    at least one processor configured to read and execute the computer executable instructions, the computer executable instructions causing the at least one processor to:
    detect a presence of an occupant in a space of a vehicle;
    detect a position of an object associated with the occupant;
    determining whether the vehicle is nearing, arriving, or has arrived at a destination based on destination information received from an occupant or a device of an occupant and global navigation information corresponding to a location of the vehicle; and
    control to illuminate an area corresponding to the position of the object in response to determining that the vehicle is nearing, arriving, or has arrived at the destination.

11. The apparatus of claim 10, wherein the computer executable instructions cause the at least one processor to determine whether the occupant will be exiting the space, and
    wherein the computer executable instructions cause the at least one processor to control to illuminate the area corresponding to the position of the object in response to determining that the occupant will be exiting the space and determining that the vehicle has arrived at the destination.

12. The apparatus of claim 10, wherein the position of the object within the space comprises at least one of a cup holder, a seat, a floor, a charging pad, a glovebox, a center console, a storage container, a storage area, and a door compartment.

13. The apparatus of claim 10, further comprising a spotlight configured to direct light at the area corresponding to the position of the object, and
    wherein the computer executable instructions further cause the at least one processor to control to activate the spotlight and control the spotlight to direct light at the area corresponding to position of the object.

14. The apparatus of claim 13, wherein the spotlight comprises at least one from among a swivel and a pivot, and
    wherein the computer executable instructions further cause the at least one processor to control to activate the spotlight to swivel or pivot to direct light to the area corresponding to the position of the object.

15. The apparatus of claim 10, further comprising one or more lights disposed in at least one from among a cup holder, a seat, a floor, a charging pad, a glovebox, a center console, a storage container, a storage area, and a door compartment, and
    wherein the computer executable instructions further cause the at least one processor to control to activate the one or more lights at the area corresponding to the position of the object.

16. The apparatus of claim 10, wherein the sensor comprises at least one from among a heat detection sensor, an image sensor, a weight sensor, a communication port, and a pressure sensor, and
    wherein the computer executable instructions further cause the at least one processor to detect the position of object associated with the occupant based on information provided by the at least one from among a heat detection sensor, an image sensor, a weight sensor, and a pressure sensor.

17. The apparatus of claim 10, further comprising at least one of a door open and close sensor, a heat detection sensor, an image sensor, a weight sensor, and a pressure sensor, and wherein the computer executable instructions further cause the at least one processor to detect the presence of the occupant in the space based on information provided by the at least one from among a door open and close sensor, a heat detection sensor, an image sensor, a weight sensor, and a pressure sensor.

* * * * *